United States Patent [19]

Temperley et al.

[11] 4,099,600
[45] Jul. 11, 1978

[54] DISC BRAKE ASSEMBLY

[75] Inventors: Harry Davison Temperley; David Parsons, both of Leamington Spa, England

[73] Assignee: Automotive Products Limited, Leamington Spa, England

[21] Appl. No.: 747,306

[22] Filed: Dec. 3, 1976

[30] Foreign Application Priority Data

Dec. 11, 1975 [GB] United Kingdom ............... 50789/75

[51] Int. Cl.² .......................................... F16D 55/224
[52] U.S. Cl. ................................................. 188/73.4
[58] Field of Search ................... 188/73.1, 73.2, 73.3, 188/73.4

[56] References Cited

U.S. PATENT DOCUMENTS

| | | | |
|---|---|---|---|
| 3,199,632 | 8/1965 | Chouings | 188/73.4 |
| 3,245,500 | 4/1966 | Hambling et al. | 188/73.4 X |
| 3,363,727 | 1/1968 | Thirion | 188/73.4 |

Primary Examiner—Duane A. Reger
Attorney, Agent, or Firm—Kemon & Estabrook

[57] ABSTRACT

A disc brake is of the kind which has an actuator on one side of the disc only, the brake pad on the other side of the disc to the actuator being applied to the disc by the actuator through a yoke of closed loop form. The yoke is constructed with two overlapping sheet metal pressings which are generally flat except where they pass over the periphery of the disc where one pressing is domed away from the other to form a box-section.

7 Claims, 6 Drawing Figures

DISC BRAKE ASSEMBLY

The invention relates to a brake assembly for braking a rotatable brake disc, the assembly being of the kind in which, in use, an actuator is disposed on one side of the disc and two brake pads are disposed one each side of the disc, the pad on the same side of the disc as the actuator being applied to the disc by a direct thrust from the actuator and the other pad being applied to the disc by the actuator through a movable yoke of closed loop form which encircles the brake pads and a chord of the disc.

Usually the yoke is a heavy gauge metal pressing and, to provide a compact installation on a motor vehicle where there is a restriction on the space between the brake disc and the roadwheel which is to be braked, it is common practice to press the yoke so as to conform to the disc periphery, i.e. where the yoke passes through the planes of the pad friction surfaces. However, this practice weakens the yoke in that it is difficult to provide a yoke with the desired degree of stiffness between the actuator and the brake pad which is on the other side of the disc to the actuator. If the yoke is stiffened by increasing the cross-section of the pressing, then the weight is increased. Besides increasing the unsprung weight of the axle and the material cost of the assembly, there is the less obvious drawback that the force of the usual anti-rattle springs which holed the yoke to its fixed support has to be increased to offset the increased effect of centrifugal force during vehicle cornering. Such an increase leads to brake drag and undue brake pad wear.

It is therefore an object of the invention to provide a disc brake assembly which incorporates a pressed yoke of high rigidity and low weight.

According to the invention a brake assembly of the kind described has a yoke which comprises two sheet metal pressings which are joined to form hollow box-sections in the region where the yoke passes through the planes of the pad friction surfaces.

One embodiment of the invention will now be described by way of example and with reference to the accompanying drawings, in which.

Figure 1:
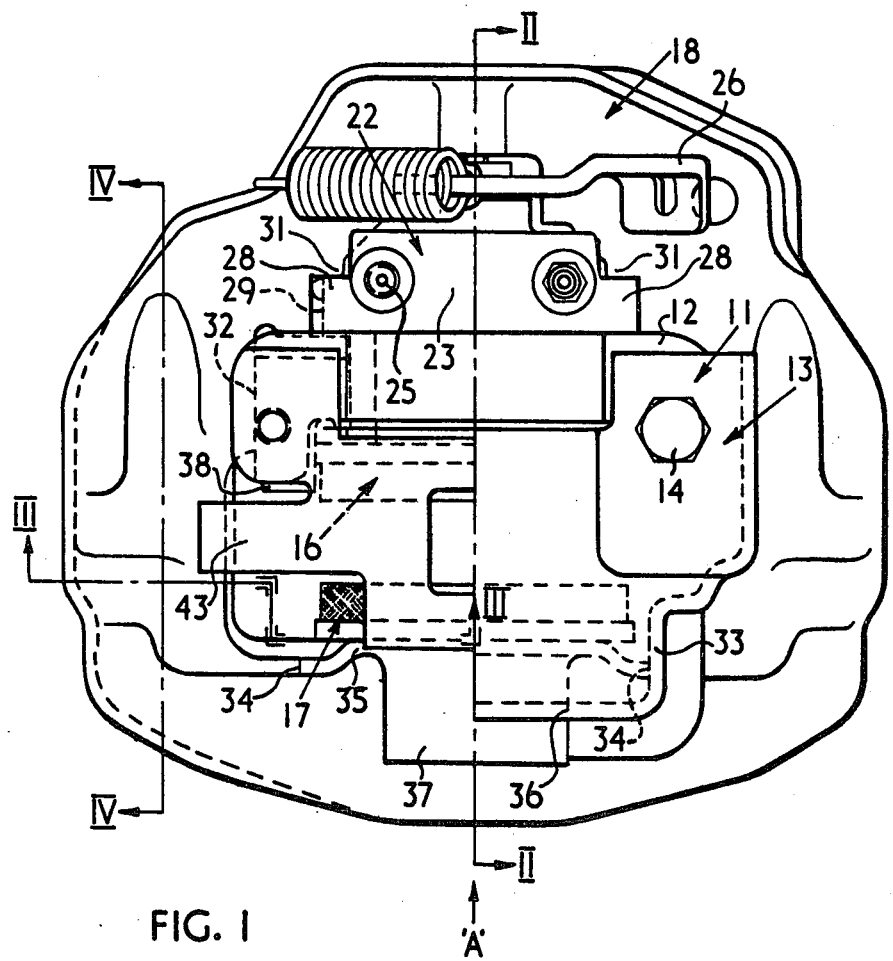
FIG. 1 is a composite plan view of a brake assembly according to the invention showing, to the right of the centreline, a full view of the assembly with certain hidden details ghosted and, to the left of the centreline, a view with a part removed and further hidden details ghosted.
Figure 2:
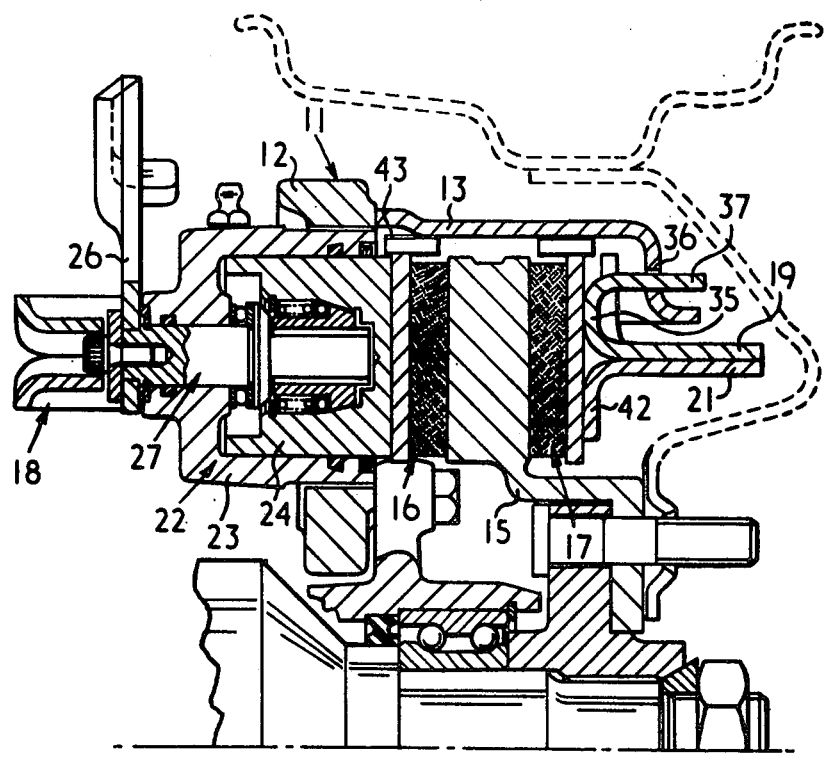
FIG. 2 is a section on the line II—II of the assembly shown in FIG. 1, showing, in this figure only, the disc to be braked.
Figure 3:
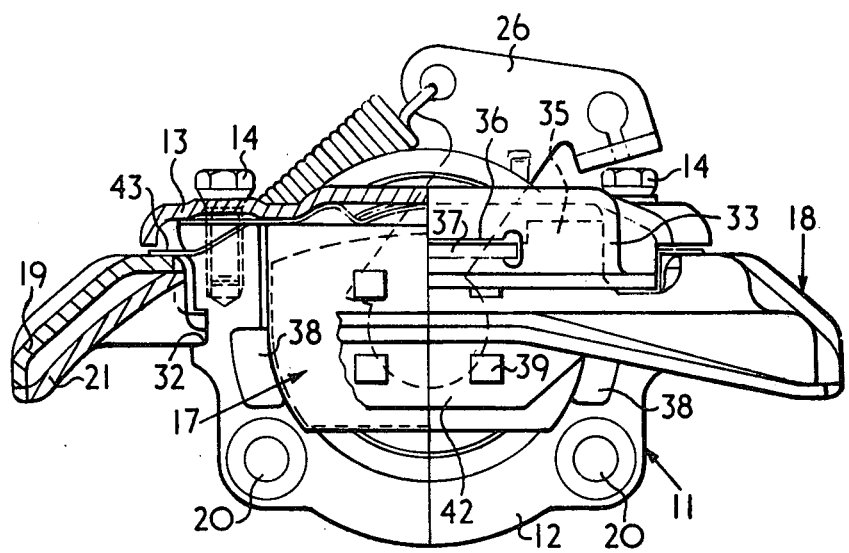
FIG. 3 is a composite end elevation and sectional view showing, to the right of the centreline, a full view on arrow A of the assembly shown in FIG. 1 with certain hidden details ghosted, and, to the left of the centreline, a section on the line III—III of the assembly shown in FIG. 1, with further hidden details ghosted.
Figure 4:
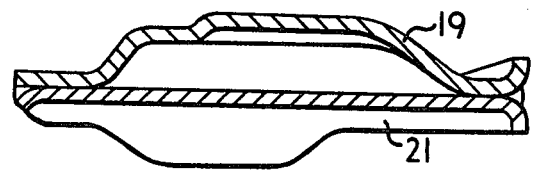
FIG. 4 is a section on the line IV—IV of FIG. 1.
Figure 5:
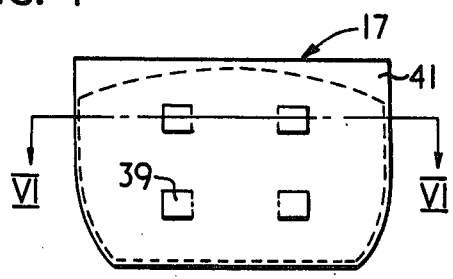
FIG. 5 is an elevation of a disc brake pad of the assembly shown in FIG. 1.
Figure 6:
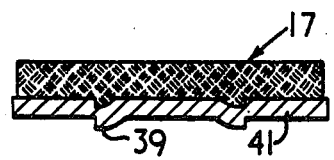
FIG. 6 is a section on the line VI—VI of FIG. 5.

The brake assembly shown in FIGS. 1–6 includes a fixed support 11 comprising a malleable iron casting 12 and a pressed steel bracket 13 attached to the casting 12 by two set screws 14. The casting 12 has holes 20 allowing it to be attached to a structure fixed relative to a rotatable brake disc 15 which is flanked by two brake pads 16, 17 each having a friction surface thereon for frictional contact with the brake disc 15.

A yoke 18, of closed loop form to encircle the two brake pads 16, 17 and a chord of the disc 15, comprises two overlapping sheet metal pressings 19, 21. Each pressing 19, 21 is generally flat except where it passes over the periphery of the disc 15 where it is twisted and bent so as to generally conform with the disc outer periphery. The pressings 19, 21 are in contact over the areas which are flat but where the yoke 18 passes over the periphery of the disc 15 the upper pressing 19 is shaped so that in section it is domed away from the lower pressing 21. The pressing 19, 21 are welded together at their inner and outer edges where the yoke 18 passes over the periphery of the disc and at spaced intervals on the outer edges elsewhere. Thus in the region where the yoke 18 passes through the planes of the brake pad friction faces the pressings 19, 21 form hollow box sections, as can be seen particularly in FIG. 3 and FIG. 4.

The brake pads 16, 17 are applied to the disc 15 by a known type of hydraulic/mechanical actuator assembly 22. The actuator 22 comprises a cylinder 23 and a piston 24 which are forced apart by hydraulic pressure at an inlet port 25. A screw and nut mechanism which also acts as an automatic adjuster is operated by a lever 26 fixed to a rotatable spindle 27 to force the piston 24 and cylinder 23 apart mechanically.

The cylinder 23 has two diametrically opposite lugs 28 on its outer periphery. Each lug 28 has a groove 29 in its radially outer edge, the groove 29 being of rectangular cross-section and of the same width as the combined thickness of the two plates 19, 21. The cylinder 23 is held within the central opening of the yoke 18 by means of the grooves 29 and is arranged so that the lugs 28 abut shoulders 31 formed by the inner periphery of the yoke 18.

The fixed support casting 12 has a large diameter central opening to provide clearance for the cylinder 23. Grooves 32 of the same width as the combined thickness of the two plates 19, 21 provide guide surfaces on the fixed support 11 which guide and support the yoke 18 on the same side of the disc 15 as the actuator 22. The pressed steel bracket 13 has parallel walls 33 which act as guide surfaces which co-operate with the side edges 34 of a bent-up flange 35 on the inner edge of the upper plate 19 for guiding and supporting the yoke 18 against movement parallel to the chord of the disc 15 which is encircled by the yoke 18. A slot 36 in the bracket 13 has edges which co-operate with a tongue 37 formed as a bent-over extension of the flange 35 to act as guide surfaces for guiding and supporting the yoke 18 against movement perpendicular to said chord and parallel to the rubbing surfaces of the brake pads 16, 17.

The brake pad 16 on the same side of the brake disc 15 as the actuator 22 is supported against brake drag by lugs 38 which extend from the fixed support casting 12 towards the brake disc 15 to flank the curved edges of the pad backing plate 41. The other brake pad 17 is supported against brake drag by the yoke 18, half-sheared tabs 39 in the pad backing plate 41 (FIGS. 5 and 6) co-operating with rectangular holes in the flange 35 and in another flange 42 bent down from the lower pressing 21. A large spring steel anti-rattle plate 43 is held in position by sandwiching between the pressed steel bracket 13 and the fixed support casting 12. This plate 43 presses down on both brake pads 16, 17 and onto the yoke 18 to prevent the yoke rattling in its guiding surfaces on the fixed support 11. The brake pad 16 is identical to the brake pad 17, the piston 24 having grooves in its face abutting the pad 16 so that the brake pad 16 and piston 24 are prevented from relative rotation by the tabs 39 engaging the sides of the grooves.

When the actuator 22 is operated, either by hydraulic pressure at the inlet port 25 or by turning the lever 26, the cylinder 23 and piston 24 are forced apart. The piston 24 applies a direct thrust to the brake pad 16 to apply it to the disc 15, the other pad brake 17 being applied to the disc by the reaction force of the cylinder 23 acting through the yoke 18.

By providing the guide surfaces for the yoke on both sides of the disc and by taking the drag load of the pad 16 directly by the fixed support, the drag load of the pad 17 does not tend to cause the yoke to twist and so jam the guide surfaces. The relatively narrow surfaces provided by the side edges 34 of the flange 35 and by the edges of the slot 36 help to prevent jamming by road dirt when the disc brake assembly is installed on a motor vehicle. The box sections provided in the yoke in the region where it passes through the planes of the pad rubbing surfaces add to the stiffness of the yoke 18 and compensate for loss of rigidity caused by bending the pressings 19, 21 to conform to the periphery of the disc.

We claim:

1. A disc brake assembly comprising:
    (a) A rotatable disc;
    a pair of brake pads, each having a friction surface thereon for frictional contact with the brake disc, disposed one on each side of the disc;
    an actuator, on one side of the disc, operatively connected to one of said brake pads to apply said one brake pad to the disc by a direct thrust;
    and a yoke, of closed loop form, which encircles the brake pads and a cord of the disc, operatively connected to the actuator to apply the other of said brake pads to the disc, the yoke comprising two sheet metal pressings which are joined to form hollow closed box-sections providing cross-sections through the yoke in the form of two continuous loops of pressing metal where the yoke passes through the planes of the pad friction surfaces.

2. The disc brake assembly of claim 1 wherein the yoke pressings are joined by welding.

3. The disc brake assembly of claim 1 further comprising a fixed support which extends over the periphery of the disc and has guide surfaces thereon on each side of the disc for guiding and supporting the yoke on both sides of the disc, said one brake pad being supported against disc drag by the fixed support and said other brake pad being supported against disc drag by the yoke.

4. The disc brake assembly of claim 3 wherein the fixed support comprises a pressed sheet metal bracket which extends over the periphery of the disc to guide and support the yoke on the other side of the disc to the actuator.

5. The disc brake assembly of claim 4, wherein the bracket comprises parallel walls, opposite faces of which provide those guide surfaces on the other side of the disc to the actuator which guide and support the yoke against movement parallel to said chord of the disc, and wherein the yoke further comprises a flange having edges thereon which co-operate with the guide surfaces on side parallel walls.

6. The disc brake assembly of claim 4 wherein the bracket defines a slot, opposite edges of which provide those guide surfaces on the other side of the disc which guide and support the yoke against movement perpendicular to said chord of the disc and parallel to the brake pad rubbing surfaces, and wherein the yoke further comprises a tongue which co-operates with the edges of said slot.

7. The disc brake assembly of claim 3 wherein the fixed support defines grooves therein which co-operate with yoke to provide those guide surfaces which guide and support the yoke on the same side of the disc as the actuator.

* * * * *